US012617571B2

(12) United States Patent
Boehmike et al.

(10) Patent No.: US 12,617,571 B2
(45) Date of Patent: May 5, 2026

(54) FIXING APPARATUS FOR A CONTAINER, AND SYSTEM FOR PROCESSING CONTAINERS

(71) Applicant: Bausch + Stroebel SE + Co. KG, Ilshofen (DE)

(72) Inventors: Andreas Boehmike, Ilshofen (DE); Steffen Heier, Ilshofen (DE); Klaus Kaiser, Ilshofen (DE); Daniel Spieler, Ilshofen (DE); Sebastian Faerber, Ilshofen (DE); Manuel Wallisch, Ilshofen (DE)

(73) Assignee: Bausch + Stroebel SE + Co. KG, Ilshofen (DE)

( * ) Notice: Subject to any disclaimer, the term of this patent is extended or adjusted under 35 U.S.C. 154(b) by 0 days.

(21) Appl. No.: 18/781,481

(22) Filed: Jul. 23, 2024

(65) Prior Publication Data

US 2024/0375809 A1     Nov. 14, 2024

Related U.S. Application Data

(63) Continuation of application No. PCT/EP2023/051824, filed on Jan. 25, 2023.

(30) Foreign Application Priority Data

Jan. 28, 2022    (DE) .................... 10 2022 102 004.5

(51) Int. Cl.
    B65B 43/46        (2006.01)
    B65B 3/00         (2006.01)
                          (Continued)
(52) U.S. Cl.
    CPC ............. B65B 43/46 (2013.01); B65B 3/003 (2013.01); B65B 3/28 (2013.01); B65B 43/54 (2013.01); G01G 17/04 (2013.01)

(58) Field of Classification Search
    CPC ... G01G 17/04; B25J 15/0028; B65G 47/842; B65B 3/28; B65B 35/16; B65B 35/36; B65B 43/46
                          (Continued)

(56) References Cited

U.S. PATENT DOCUMENTS 5,600,104 A * 2/1997 McCauley ............. G01G 19/12
                                                    177/136
5,721,398 A * 2/1998 Balsen ................. G01G 23/005
                                                    177/186
                          (Continued)

FOREIGN PATENT DOCUMENTS

CH        281895 A      3/1952
DE        1482616 A1 * 1/1969 ............. B67C 7/004
                          (Continued)

OTHER PUBLICATIONS

Search Report received in International Application No. PCT/EP2023/051824 dated Mar. 30, 2023, with translation, 7 pages.
                          (Continued)

*Primary Examiner* — Joshua G Kotis
(74) *Attorney, Agent, or Firm* — Christopher A. Rothe; CM Law

(57)            ABSTRACT

A fixing apparatus for temporarily fixing a container to a weighing apparatus includes a holding device and a support device. The holding device has a container receptacle and a contact body. The container is insertable into and removeable from the container receptacle. At least one holding element holds the container in the container receptacle. The support device has a support body and a connection body connected to the support body, for connecting to the weighing apparatus. The holding device rests on the support body via the contact body. The contact body is movable relative to the support body based on a force acting on the holding device, in particular on the at least one holding element, (Continued)

when the container is inserted into the container receptacle and/or when the container is removed from the container receptacle. A system for processing containers, in particular pharmaceutical containers, can include the fixing apparatus.

28 Claims, 6 Drawing Sheets

(51) Int. Cl.
*B65B 3/28* (2006.01)
*B65B 43/54* (2006.01)
*G01G 17/04* (2006.01)

(58) Field of Classification Search
USPC ............................................. 177/52; 141/83
See application file for complete search history.

(56) References Cited

U.S. PATENT DOCUMENTS

| | | | | |
|---|---|---|---|---|
| 5,806,287 | A * | 9/1998 | Trechsel | ................... B65B 1/46 |
| | | | | 53/251 |
| 6,073,667 | A * | 6/2000 | Graffin | ................ G01G 3/1402 |
| | | | | 177/229 |
| 6,399,901 | B1 * | 6/2002 | Nishino | .................. B67C 3/242 |
| | | | | 177/187 |
| 6,452,118 | B1 * | 9/2002 | van Pinxteren | ........ G01G 19/14 |
| | | | | 209/912 |
| 6,513,643 | B2 | 2/2003 | Nakada | |
| 6,688,341 | B1 * | 2/2004 | Meunier | ............... G01G 19/18 |
| | | | | 141/83 |
| 7,278,451 | B2 * | 10/2007 | Cavallari | ............... B67C 3/202 |
| | | | | 141/253 |
| 9,193,538 | B2 | 11/2015 | Schulnig | |
| 9,546,083 | B2 * | 1/2017 | Lorenz | ................... B67C 3/202 |
| 9,670,045 | B2 * | 6/2017 | Riggio | ...................... B67C 3/24 |
| 9,694,984 | B2 | 7/2017 | Pospiech et al. | |
| 11,332,324 | B2 | 5/2022 | Wallisch | |
| 2002/0139640 | A1 * | 10/2002 | Nakada | ................... B07C 5/362 |
| | | | | 198/470.1 |
| 2006/0042911 | A1 | 3/2006 | Nakajima et al. | |
| 2006/0076078 | A1 * | 4/2006 | Monti | ................... G01G 15/00 |
| | | | | 141/83 |
| 2009/0067973 | A1 | 3/2009 | Eliuk et al. | |
| 2010/0282574 | A1 * | 11/2010 | Ueda | ................... B65G 17/323 |
| | | | | 198/803.3 |
| 2012/0012224 | A1 * | 1/2012 | Haeuslmann | ........... B67C 3/202 |
| | | | | 141/83 |
| 2014/0008927 | A1 * | 1/2014 | Rousseau | .......... B29C 49/42093 |
| | | | | 294/90 |
| 2015/0291714 | A1 | 10/2015 | Hintzer et al. | |
| 2017/0183113 | A1 | 6/2017 | Deutschle et al. | |
| 2019/0291971 | A1 | 9/2019 | Schulnig | |
| 2019/0307643 | A1 | 10/2019 | Tribble et al. | |
| 2021/0016436 | A1 * | 1/2021 | Turgeman | ................ B25J 9/109 |
| 2021/0155420 | A1 * | 5/2021 | Wallisch | ................ B65G 47/82 |
| 2021/0299887 | A1 * | 9/2021 | Lindner | ............. B25J 15/0042 |
| 2022/0194771 | A1 * | 6/2022 | Seewald-Raider | ..... B67C 3/007 |

FOREIGN PATENT DOCUMENTS

| | | | |
|---|---|---|---|
| DE | 29923418 U1 | 5/1999 | |
| DE | 10318731 A1 | 11/2004 | |
| DE | 102004035061 A1 | 2/2006 | |
| DE | 102006012020 A1 | 9/2007 | |
| DE | 102012209714 A1 * | 12/2013 | ............ G01G 15/00 |
| DE | 102014111564 A1 | 2/2016 | |
| DE | 102018213800 A1 | 2/2020 | |
| DE | 102019106377 A1 | 9/2020 | |
| DE | 102022101994 A1 | 8/2023 | |
| EP | 1245513 A1 | 10/2002 | |
| EP | 2248759 A1 | 11/2010 | |
| EP | 2769942 A1 | 8/2014 | |
| EP | 2949353 A2 | 12/2015 | |
| EP | 3072834 A1 | 9/2016 | |
| EP | 3239078 A1 | 11/2017 | |
| EP | 3928931 A1 | 12/2021 | |
| GB | 2593907 A * | 10/2021 | ............ B25J 15/022 |
| WO | WO-9946568 A1 * | 9/1999 | ............ G01G 19/14 |

OTHER PUBLICATIONS

Search Report received in International Application No. PCT/EP2023/051817 dated May 2, 2023, with translation, 6 pages.
Search Report received in International Application No. PCT/EP2023/051822 dated May 25, 2023, with translation, 7 pages.

* cited by examiner

FIXING APPARATUS FOR A CONTAINER, AND SYSTEM FOR PROCESSING CONTAINERS

CROSS-REFERENCE TO RELATED APPLICATIONS

This application is a continuation of International Application No. PCT/EP2023/051824, filed on Jan. 25, 2023, and claims priority to German Application No. 10 2022 102 004.5, filed on Jan. 28, 2022. The contents of International Application No. PCT/EP2023/051824 and German Application No. 10 2022 102 004.5 are incorporated by reference herein in their entireties.

FIELD

The present disclosure relates to a fixing apparatus for temporarily fixing an in particular pharmaceutical container to a weighing apparatus of a system for processing containers, in particular pharmaceutical containers.

The present disclosure also relates to a system for processing containers.

BACKGROUND

In such a system, the containers, for example syringes, carpules, ampules, and/or vials, typically run through different types of processing apparatuses, which can also be referred to as processing stations, from an inlet to an outlet. For example, the containers supplied via the inlet are first weighed, then filled with a product, weighed again, sealed, and coupled out via the outlet. It is conceivable here that the processing apparatuses be combined spatially and functionally. For example, only one weighing apparatus is used, on which the containers are first weighed empty (tare weighing), filled, and then weighed when full (gross weighing).

The containers can in particular be pharmaceutical containers, such as syringes, carpules, ampules, and/or vials. In the present case, "containers" can also comprise other types of packaging means, such as cosmetic containers. The product can be a pharmaceutical substance.

For transporting the containers, the system typically comprises a transport apparatus. In a synchronized transport apparatus, for example, the containers are processed in a plurality, in groups or individually. For this purpose, the containers must be temporarily placed or fixed on a processing apparatus, preferably in a defined position. In the case of a weighing apparatus of the system, it must be ensured in particular that the containers assume a defined target position and are preferably not moved in this position during the weighing process. With regard to a possible overloading and/or with regard to a short settling time of the weighing cell, it is advantageous if forces acting on the weighing cell can be kept as low as possible when the container is placed onto the fixing apparatus on the weighing apparatus and when the container is removed from the weighing apparatus.

In the case of stable containers, in particular vials, for this reason this can be easily implemented, because the stable containers can be placed on a set-down element on the weighing cell. In this case, a fixing apparatus can be omitted. The situation is different with so-called non-stable containers which, due to their geometry, do not stand by themselves and therefore have to be fixed in some other way. Non-stable containers include, for example, syringes (including possible needle guard), carpules, ampules, or other types of packaging means which cannot stand independently due to their geometry.

SUMMARY

The object of the present disclosure is to provide a fixing apparatus for an in particular pharmaceutical container for use on a weighing apparatus of a system for processing containers, wherein a higher process reliability can be ensured with the fixing apparatus. In addition, the object of the present disclosure is to provide a system for processing containers with a weighing apparatus and a fixing apparatus.

This object is achieved by a fixing apparatus in accordance with the present disclosure for temporarily fixing a container, in particular pharmaceutical container, to a weighing apparatus of a system for processing containers, comprising a holding device and a support device, wherein the holding device comprises a container receptacle into which the container is insertable and out of which the container is removeable, at least one holding element for holding the container in the container receptacle, and a contact body, wherein the support device comprises a support body and a connection body, which is connected to the support body for connecting to the weighing apparatus, wherein the holding device rests on the support body via the contact body, wherein the contact body is configured to be movable relative to the support body on the basis of a force acting on the holding device, in particular on the at least one holding element, when the container is inserted into the container receptacle and/or when the container is removed from the container receptacle.

In the fixing apparatus in accordance with the present disclosure, the holding device rests on the support device, wherein the contact body rests on the support body. These two bodies are movable relative to one another. If a force acts on the holding device, the holding body is movable relative to the support body and thus the holding device is movable relative to the support device. Due to this relative movement, the possibility exists at least to a certain extent of decoupling the holding device from the support device with regard to the acting force. The force acting on the support device, which can be transmitted to the weighing cell of the weighing apparatus, is thereby preferably reduced relative to the force acting on the holding device. In particular, the fixing apparatus can accordingly comprise or form a force decoupling device. The force acting on the holding device is based, for example, on the fact that the container comes into contact with the at least one holding element and/or the container receptacle during insertion. Conversely, when being removed from the container receptacle, the container can for example come into contact with the holding element. The force on the holding device can accordingly act, for example, in a direction of insertion of the container and/or in a removal direction of the container.

By reducing the force acting on the weighing cell, for example an excessively high load on the weighing cell, which could lead to damage, can be avoided. In addition, the settling behavior of the weighing apparatus is improved because the settling time is reduced. A further advantage of the present disclosure can in particular be to reduce the risk of damage to the container during insertion into the container receptacle and/or during removal from the container receptacle, because the holding device is non-rigidly connected to the support device and thus to the weighing apparatus.

The present disclosure incorporates the consideration that the weight of the container is or can be determined at the weighing cell of the weighing apparatus during a tare weighing and during a gross weighing, together with the weight of the fixing apparatus. The weight of the fixing apparatus can be subtracted as an offset of the overall weight determined with the weighing cell in order to determine the container weight. This is equivalent to the weight of the fixing apparatus being assumed as the "zero point" of the determined weight of the weighing cell, so to speak.

Position and orientation indications, such as "top", "above", "below", or the like relate in the present context to use as intended of the fixing apparatus. In the present context, "resting on" is to be understood in particular to mean that the contact body is arranged directly above the support body relative to the direction of gravity, and contacts it.

It can be provided that the holding device has exactly one container receptacle for only one container.

The fixing apparatus in accordance with the present disclosure proves to be particularly advantageous for weighing non-stable containers such as syringes, cartridges, ampules, or other types of packaging means which cannot stand upright independently due to their geometry.

The holding device expediently rests on the support device solely via the contact body and the support body.

It is preferably provided that the holding device and the support device, in particular the contact body and the support body, rest loosely on one another.

The holding device and the support device, in particular the contact body and the support body, preferably do not have an in particular fixed mechanical connection to one another.

The holding device and the support device, in particular the contact body and the support body, preferably do not have a joint with joint members that are movably connected to one another. In particular, a rotary joint and/or a sliding joint can be omitted, for example.

In a preferred embodiment of the present disclosure, the holding device can be placed on the support device in the direction of gravity and can be lifted from the support device against the direction of gravity and thereby detached from it.

It is advantageous if the container can be inserted into the container receptacle in a defined direction of insertion and/or can be removed from the container receptacle in a defined removal direction. The direction of insertion and the removal direction are preferably opposite one another.

In a preferred embodiment of the present disclosure, the direction of insertion and/or the removal direction is arranged in particular in a horizontal plane.

The fixing apparatus is preferably configured such that the direction of insertion and/or the removal direction is aligned transversely and in particular perpendicularly to a direction of extension of the container. Containers such as syringes, cartridges, or ampules are configured to extend longitudinally and define a direction of extension. By inserting and/or removing transversely and in particular perpendicularly to the direction of extension, a lifting movement during the transfer and/or removal can be avoided, as can any resulting abrasion of machine parts.

The holding device can be movable in different ways relative to the support device.

In a preferred embodiment, the holding device is configured to be tiltable relative to the support device when the container is inserted into the container receptacle and/or when it is removed from the container receptacle. Here for example two tilting directions can be provided which are opposite to one another. For example, the holding device tilts toward the rear relative to the support device, relative to the direction of insertion when the container is inserted into the container receptacle. When the container is removed, the holding device tilts relative to the support device, for example forward in the opposite direction.

The force acting on the holding device during the insertion and/or the removal of the container leads in particular to a tilting moment on the holding device.

"Inserting" can also be understood here as "introduction," and vice versa.

It can be provided that the holding device is configured to be displaceable relative to the support device. For example, a displacement in two mutually opposite directions can take place depending on the direction of movement of the container and the associated force on the holding device.

It is advantageous if the fixing apparatus or the system for processing containers comprises a stationary stop part having at least one first stop element, wherein the holding device comprises at least one corresponding second stop element for interacting with the at least one first stop element, wherein a range of movement of the holding device relative to the support device is limited in at least one direction, preferably in two directions, via the stop elements. Via the stop elements, the movement of the holding device relative to the support device can be permitted within a certain range of movement, but the range of movement is limited when the stop elements abut against one another. This is preferably possible when the container is inserted and/or when the container is removed in order to limit the range of movement in two directions. The stop elements can preferably also limit the force acting on the support device and thus acting on the weighing apparatus.

In the present case, "stationary" is to be understood in particular as meaning that the stop part is held immovably on the system in accordance with the present disclosure or a component of the system, for example on a framework or substructure. Preferably, the stop part is held neither on the support device nor on the weighing apparatus.

The stop part can accordingly in particular be manufactured or formed separately from the support device.

The movement range of a tilting movement of the holding device relative to the support device in at least one tilting direction is preferably limited via the corresponding stop elements, preferably in two tilting directions.

It can be provided that the stop elements are arranged on a side of the holding device facing away from the container receptacle.

It can prove advantageous if in each case two stop elements of the stop part and of the holding device arranged at a distance from one another are provided. For example, the stop elements are spaced apart from one another in a transverse direction transversely and in particular perpendicularly to the direction of insertion of the container.

For example, a peg-shaped projection and an engagement opening in which the projection engages with play are provided as stop elements. The holding device can be moved relative to the stop part within the existing play. The projection can abut against the edge of the engagement opening. The projection is arranged for example on the stop part, wherein the holding device comprises the engagement opening, or vice versa. The engagement opening can for example be a through-opening, in particular on the holding device.

It is expedient if the support body and the contact body each comprise alignment elements which interact to define a target position of the contact body and of the support body. In particular, it is provided that the target position of the contact body on the support body and thus a target position of the holding device on the support device are defined via the alignment elements positioned relative to one another in the intended manner. At least one alignment element is provided on the support body and on the contact body, wherein these can each comprise a plurality of alignment elements. The alignment elements on the support body and/or on the contact body can be configured identically, or functionally identically.

The alignment elements comprise, for example, at least one projection on the support body in the direction of the contact body and at least one receptacle on the contact body for receiving the projection, or vice versa. For example, a formation on the support body or on the contact body can be regarded as a projection. In a preferred embodiment, the at least one projection is arranged, for example, on the support body, and the at least one receptacle on the contact body.

When the holding device is tilted relative to the support device, as mentioned above, the alignment elements can for example slide against one another.

Alternatively, it can be provided that the alignment elements are for example separated from one another, for example by lifting the holding device when the holding device tilts relative to the support device.

The contact body and the support body can preferably be manufactured from different materials. For example, the support body is made of metal and the contact body is made of a plastics material.

In a preferred embodiment of the present disclosure, the at least one projection is configured to be arcuate in cross section. The projection can in particular be configured to be circularly arcuate or sinusoidal, at least in portions. "Arcuate" refers in particular to the contour of the projection.

In a preferred embodiment of the present disclosure, the at least one receptacle is configured to be for example V-shaped (triangular), trapezoidal, or arcuate in cross section.

As mentioned, two alignment elements can be provided on each of the support body and the contact body. It can be favorable if the alignment elements are arranged at a distance from one another in a distance direction. The distance direction runs in particular along a direction of insertion of the container into the container receptacle. Accordingly, two alignment elements arranged one after the other can be arranged on the support body and on the contact body in the direction of insertion.

A corresponding alignment element on the support body can interact with the corresponding alignment element on the contact body.

In a preferred embodiment of the present disclosure, the alignment elements on the support body and on the contact body are configured to extend longitudinally, for example in an extension direction, and have a constant cross section. For example, the longitudinal extension runs transversely and in particular perpendicularly to the above-mentioned distance direction.

In the target position of the contact body and the support body, the at least one projection preferably rests on an edge of the at least one receptacle along two contact lines.

It can be advantageous if the support body or the contact body is configured wave-shaped along the distance direction, with two wave peaks running transversely and in particular perpendicularly to the distance direction and a wave trough between them.

It can be advantageous if the contact body or the support body has two grooves arranged at a distance from one another along the distance direction and running transversely and in particular perpendicularly to the distance direction, in particular with a V-shaped, trapezoidal, or arcuate cross section.

A preferred embodiment of the present disclosure has a wave-shaped support body and a contact body with the two grooves arranged at a distance from one another.

It is favorable if the fixing apparatus comprises interacting coupling elements between which a coupling force preferably acts to reset the holding device relative to the support device during a movement. For example, the coupling elements can counteract the movement, so that the movement of the holding device relative to the support device only begins when the force on the holding device exceeds a specified threshold value. When the movement is complete, the force between the coupling elements can in particular be a resetting force via which the contact body and the support body are transferred back into the target position. The resetting force can, for example, act in addition to gravity.

The holding device and the support device preferably each comprise a plurality of coupling elements. The coupling elements are for example spaced apart from one another. A total coupling force can thus be composed of a sum of coupling forces of two coupling elements in each case. The total coupling force can act over a larger area between the holding device and the support device, due to the distance of the coupling elements from one another. This can prove advantageous for the reliable functioning of the fixing apparatus.

The coupling elements preferably couple with one another in a contactless manner.

The coupling elements are configured for example as magnetic elements or formed by them, against the magnetic force of which the holding device is movable relative to the support device and/or can be removed from it.

In particular, it is advantageous if the coupling elements have no moving parts or are not moving parts.

For example, the holding device can be lifted from the support device against the coupling force, in particular the magnetic force. When the holding device is placed on the support device, the coupling force, in particular the magnetic force, can act in addition to gravity.

The fixing apparatus advantageously comprises in each case at least one coupling element on the contact body and on the support body, wherein preferably a plurality of coupling elements is arranged in each case on the contact body and/or on the support body.

The corresponding coupling element is arranged for example in a preferably closed receptacle on the contact body or on the support body. The coupling element is preferably held captive in the receptacle, for example a blind hole.

The at least one coupling element on the holding device and the at least one coupling element on the support device are preferably arranged directly one above the another in the direction of gravity, in particular when a target position of the contact body relative to the support body is assumed.

It can in particular prove advantageous if coupling elements are arranged on each of at least one alignment element of the contact body and of the support body. This preferably provides the possibility of ensuring the relative position of the alignment elements and thus of defining the target position of the contact body on the support body.

The holding device and the coupling device preferably each comprise at least two coupling elements which are spaced apart from one another transversely and in particular perpendicularly to a direction of insertion of the container into the container receptacle.

It can be advantageous if the fixing apparatus comprises a receptacle on the holding device or on the support device, in which receptacle the support device or the holding device engages, wherein the contact body and the support body are arranged in the receptacle. In this way, the contact body and the support body can be better protected from external influences, for example the entry of dirt and/or contamination. For example, the arrangement of the receptacle on the holding device can be advantageous, wherein the support body engages in the receptacle from below.

It is advantageous if the receptacle comprises or forms a top wall which covers the contact body and the support body, and/or a frame which surrounds the contact body and the support body along preferably the entire circumference. For example, the frame is formed by a side wall closed in the circumferential direction.

It can be advantageous if the support body or the contact body engages with play in the receptacle. A relative movement of at least one of the bodies in the receptacle is made possible via the play.

The play can preferably be greater in a direction of insertion of the container into the container receptacle than in a direction transverse and in particular perpendicular to the direction of insertion. In this way, for example, a displacement or tilting of the holding device relative to the support device when the container is inserted and/or removed is made possible. In contrast, the range of movement in the transverse direction is limited.

It is advantageous if the support body is fixed on the upper side of the connection body.

The connection body preferably comprises a connection element for detachable connection, indirectly or directly, with the weighing apparatus.

The connection body can in portions be configured for example as a column element, or can comprise a column element.

A preferred embodiment of the fixing apparatus has a pharmaceutical-grade configuration and can be used in particular in an optional insulator apparatus with an atmosphere for decontamination purposes (for example using $H_2O_2$).

The fixing apparatus is made for example of stainless steel (e.g. grade 316L (AISI/SAE)) and/or plastics material, in particular POM (polyoxymethylene) or PEEK (polyetheretherketone).

As already mentioned, the present disclosure also relates to a system.

A system in accordance with the present disclosure which achieves the object mentioned at the outset for processing containers comprises a weighing apparatus, at least one fixing apparatus of the above-mentioned type, which is connected to the weighing apparatus, and at least one transport apparatus with which at least one container is transferable to the at least one fixing apparatus and removable therefrom.

The transfer with the transport apparatus preferably takes place in a direction of insertion into the container receptacle, and the removal in a removal direction opposite the direction of insertion.

The advantages already mentioned in connection with the explanation of the fixing apparatus in accordance with the present disclosure can also be achieved with the system in accordance with the present disclosure. Advantageous embodiments of the system in accordance with the present disclosure result from advantageous embodiments of the fixing apparatus in accordance with the present disclosure. In this respect, reference is made to the above statements.

It can be provided that the weighing apparatus of the system in accordance with the present disclosure has a plurality of weighing cells and a plurality of fixing apparatuses. A fixing apparatus can, for example, be assigned to a corresponding weighing cell. For example, this provides the possibility of weighing a plurality of containers simultaneously, wherein the results can be determined independently of one another.

BRIEF DESCRIPTION OF THE DRAWINGS

The following description of preferred embodiments of the present disclosure serves in conjunction with the drawing to explain the present disclosure in more detail. In the figures.

DETAILED DESCRIPTION

Figure 1:
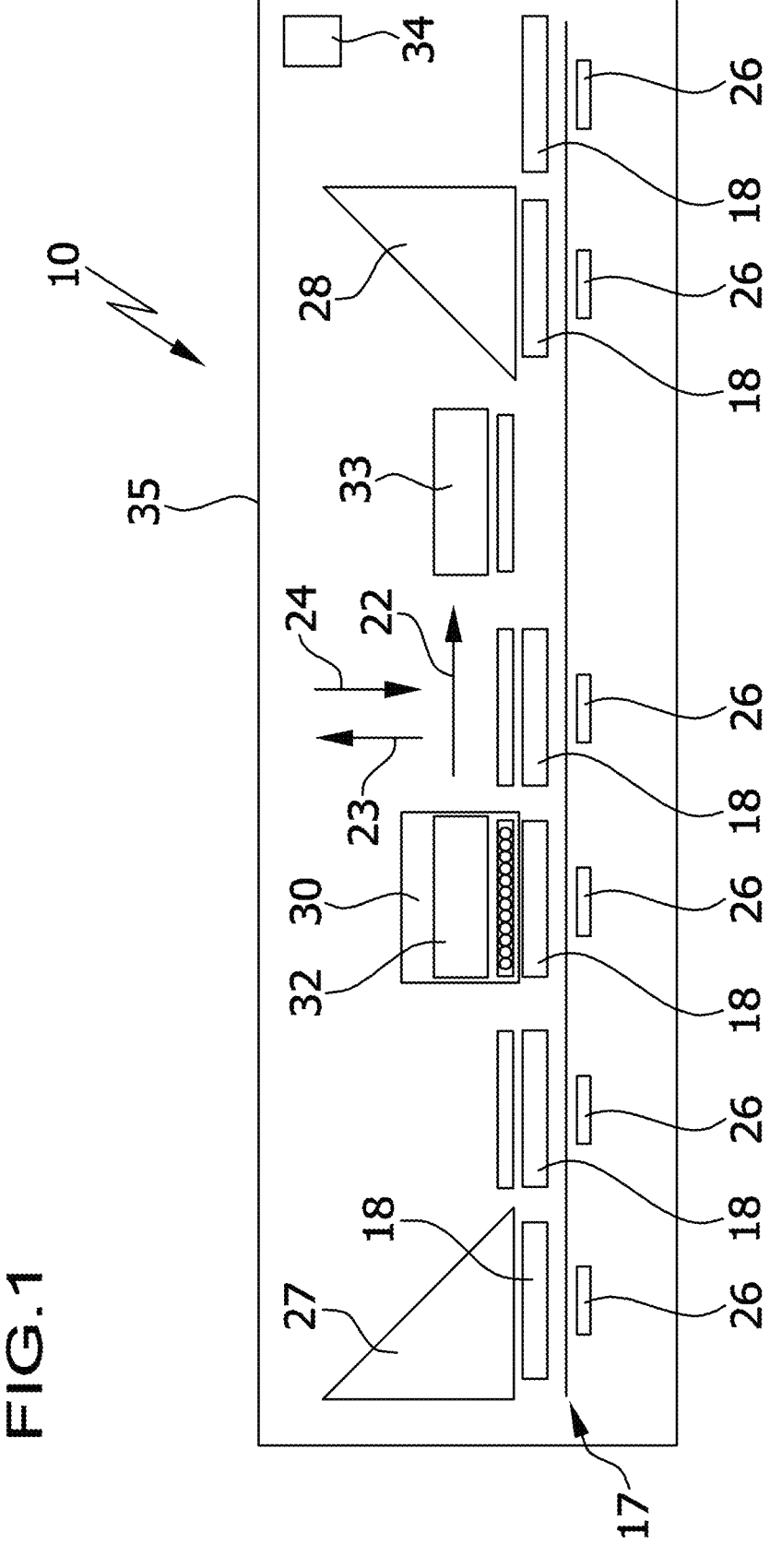
FIG. 1 is a schematic view of a system in accordance with the present disclosure for processing in particular pharmaceutical containers, comprising a plurality of fixing apparatuses in accordance with the present disclosure.

FIG. 1 shows, in a schematic view, an advantageous embodiment of a system in accordance with the present disclosure for processing containers 12, which is designated as a whole by reference numeral 10. These are pharmaceutical containers 12, in the present case. In the present example, the containers 12 are syringes 14 which have a syringe body 15 and a needle guard. The syringes 14 are in particular non-stable containers 12, which cannot stand on their own, or can do so only in rare cases on an end face formed by the needle guard.

The system 10 is used to process the containers 12 in several stages on processing apparatuses. To transport the containers 12, the system 10 comprises a transport assembly 17 with a plurality of transport apparatuses 18 movably arranged thereon.

In the present example, the transport apparatuses 18 (FIG. 2) are configured using so-called rakes/counter-rakes. The basic principle of transporting containers 12 with rakes/counter-rakes is described using the example of vials in DE 10 2018 213 800 A1 from the same applicant and for this reason is not explained further here. This mode of operation of the transport apparatus 18 is not essential or limiting for the present disclosure.

By way of explanation, with reference in particular to FIGS. 2 and 4 to 6, it is merely stated that the rake and the counter-rake each comprise a longitudinally extended holding part 19 and gripping elements 20 arranged thereon. The containers 12 can be gripped between the gripping elements 20 of the two holding parts 19. If the holding parts 19 are moved in directions pointing away from one another, the containers 12 can be released so that they can remain in a container receptacle of the fixing apparatus explained below. By moving the holding parts 19 relative to one another in the opposite direction, the containers 12 can again be gripped with the gripping elements 20.

The transport apparatuses 18 can be moved along a transport direction 22 and in the direction opposite thereto. Furthermore, the transport apparatuses 18 can be moved transversely and in particular perpendicularly to the transport direction 22 in a feed direction and in the opposite direction thereto. In the following, the feed direction is referred to as the direction of insertion 23 in the drawing, and the opposite direction as removal direction 24. The transport apparatus 18 can be moved with or without a container 12.

The gripping and releasing of containers 12 and the movement along the transport direction 22 and the directions 23, 24 is described in detail in DE 10 2018 213 800 A1, to which reference is hereby made.

For moving the transport apparatuses 18, the transport assembly 17 comprises drive apparatuses 26. The transport apparatuses 18 can be moved independently of one another.

For coupling the containers 12 at an inlet, the system 10 comprises a coupling element 27. A decoupling element 28 is provided at an outlet.

Figure 2:
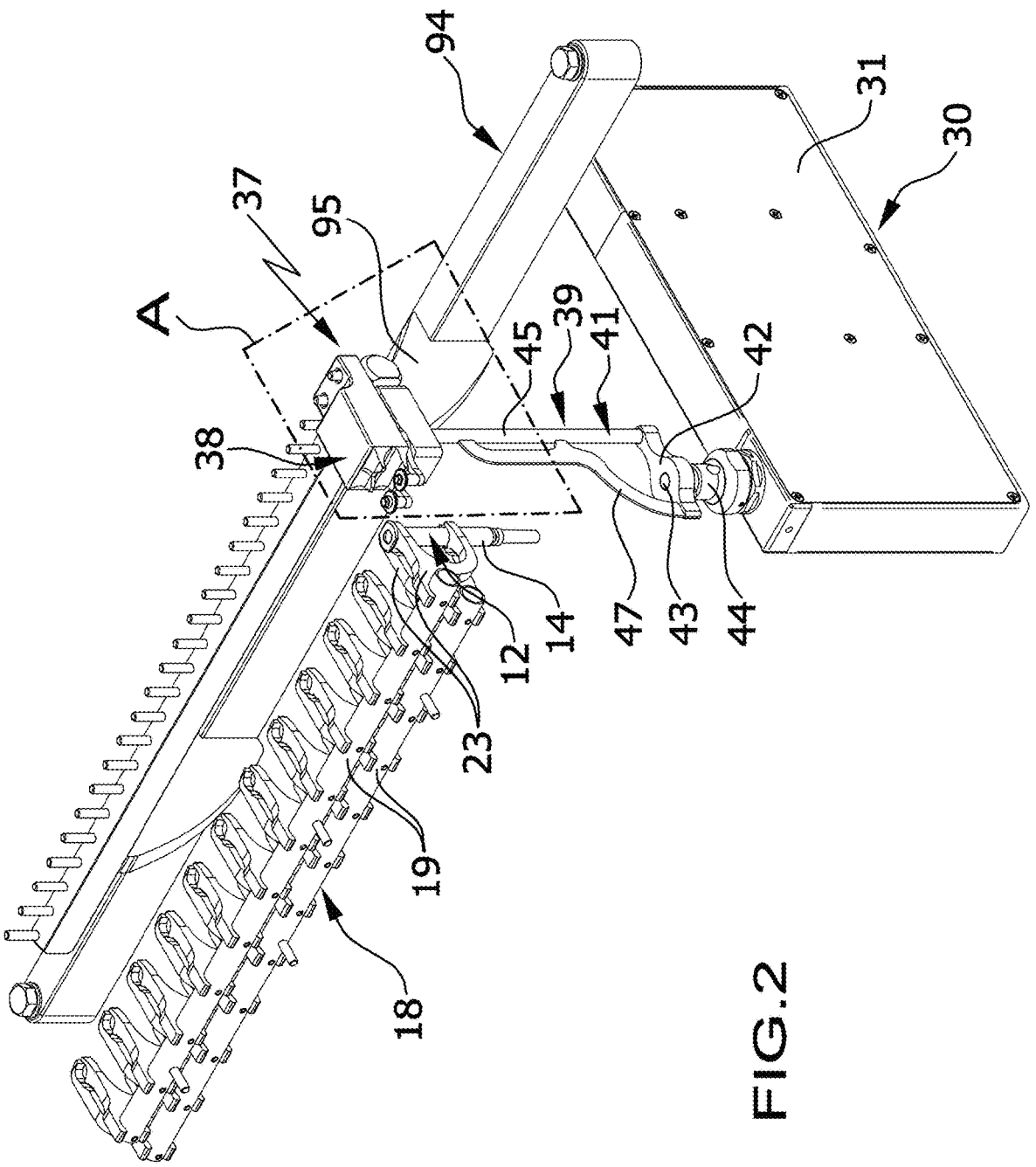
FIG. 2 is a perspective view of a fixing apparatus of the system from FIG. 1, wherein a transport apparatus having a container, a weighing cell of a weighing apparatus, and a stop part are also shown.

The system 10 comprises a weighing apparatus 30. The weight of each container 12 can be determined on the weighing apparatus 30. In the present example, the weighing apparatus 30 comprises a plurality of weighing cells 31. Only one weighing cell 31 is shown in FIG. 2 for reasons of clarity. Overall, as many weighing cells 31 are preferably provided as the transport apparatus 18 has locations and can carry containers 12 along. In the present example, there are twelve.

The weighing apparatus 30 can be used to determine the tare weight of an unfilled container 12 and the gross weight of a filled container 12 via a corresponding weighing cell 31.

A further processing apparatus is configured as a filling apparatus 32 for filling the containers 12 with a product, which in the present case is a pharmaceutical substance. The filling apparatus 32 is arranged on the weighing apparatus 30 in the present case. This results in a compact configuration of the system 10. The gross weight can be determined during the filling process or after the filling process.

Downstream of the weighing apparatus 30 and the filling apparatus 32 in the transport direction 22, the system 10 comprises a further processing apparatus configured as a closing apparatus 33. The filled containers 12 are closed at the closing apparatus 33, for example with stoppers.

The system 10 comprises a control apparatus 34 for controlling the operation. It will be understood that, if not explained here, corresponding drives can be provided for movable components of the system 10.

The system 10 comprises a framework 35 or a substructure. Optionally, an insulator apparatus covering the framework 35 can be provided to provide an atmosphere for decontamination purposes, for example using $H_2O_2$.

For temporarily fixing the containers 12 to the weighing apparatus 30, in particular to a corresponding weighing cell 31, the system 10 comprises an advantageous embodiment of the fixing apparatus in accordance with the present disclosure, which is denoted by the reference numeral 37. FIG. 2 shows only one fixing apparatus 37, which is connected to the weighing cell 31. Of course, a fixing apparatus 37 is likewise arranged on the further weighing cells 31 (not shown). The number of fixing apparatuses 37 corresponds to the number of weighing cells 31 and preferably to the number of positions on the transport apparatus 18. The fixing apparatuses 37 are identically configured.

The weighing apparatus 30 can in particular comprise the fixing apparatuses 37.

The fixing apparatus 37 comprises a holding device 38 and a support device 39.

The support device 39 is connected to the weighing cell 31. In particular, a detachable connection is conceivable.

The support device 39 comprises a connection body 41. The connection body 41 has a base element 42. A for example peg-shaped connection element 43 is arranged on the base element 42. The connection element 43 engages in a receptacle element 44 on the weighing cell 31. An anti-rotation member can be provided.

The connection body 41 further comprises a column element 45 protruding from the base element 42. The column element 45 extends in a height direction, in the present case along the direction of gravity 46. A stiffening element 47 stiffens the connection body 41 by engaging on the base element 42 and on the column element 45.

The support device 39 further comprises a support body 49 on the upper side of the column element 45. The support body 49 is fixed to a portion 50 of the connection body 41, in the present example by screwing. The portion 50 is configured plate-shaped.

Figure 3:
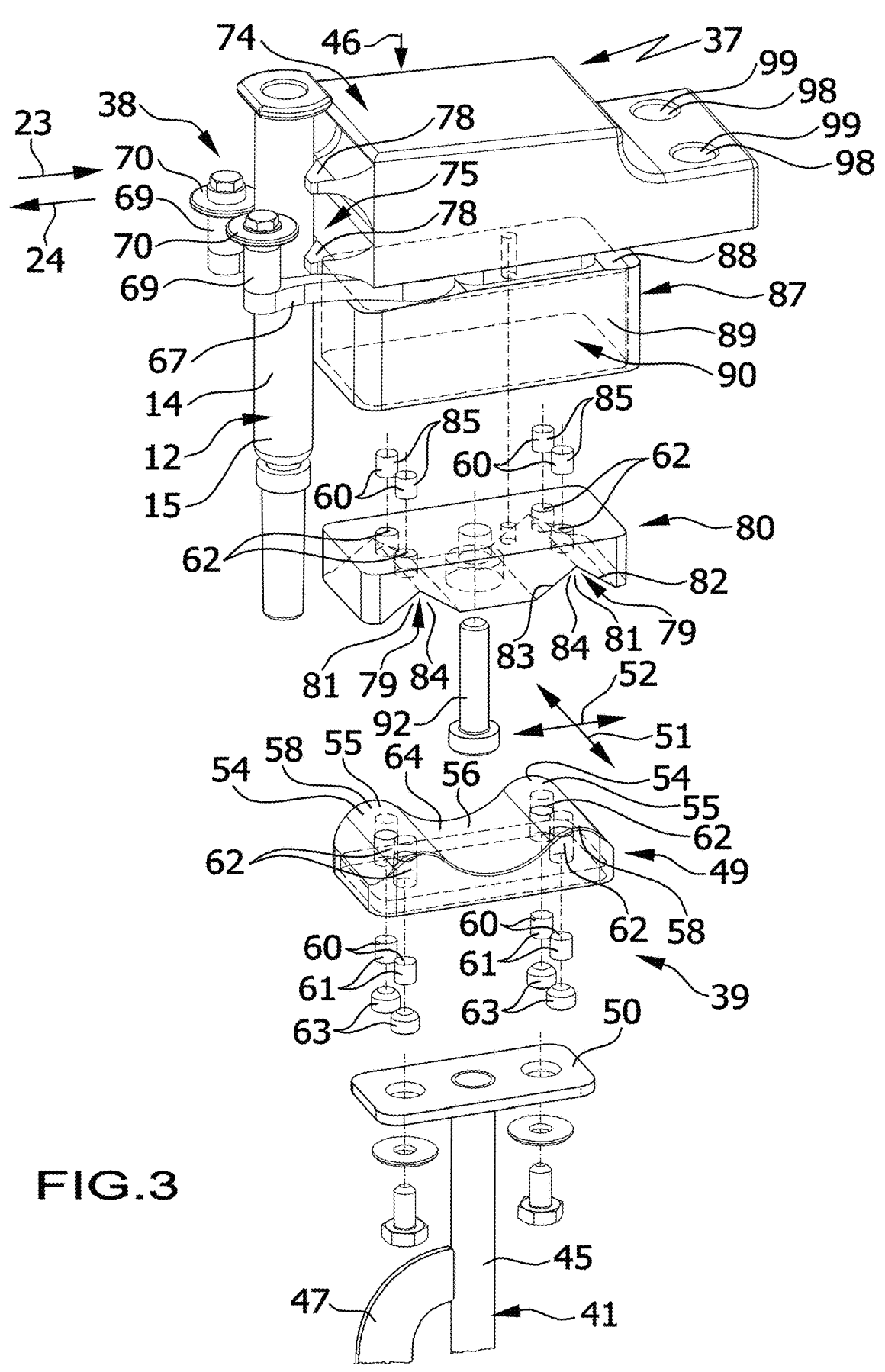
FIG. 3 is a perspective partial view of the fixing apparatus in accordance with the present disclosure with a container held thereon, in an exploded view.

The support body 49 is configured to be substantially rectangular in plan view along the direction of gravity. In the present case, the support body 49 has an extension along the direction of insertion 23 which is greater than the transverse direction 51 transversely and in particular perpendicularly thereto. FIG. 3 shows the transverse direction 51 which is aligned transversely and in particular perpendicularly to a distance direction 52. In the intended use of the fixing apparatus 37, the distance direction 52 runs along the direction of insertion 23.

It is understood that the transverse direction 51 and the distance direction 52 are defined in the reference system in particular of the fixing apparatus 37. However, it is advantageous if the distance direction 52 runs along the direction of insertion 23 and the opposite removal direction 24. This can be ensured during the installation of the system 10.

Deviating from the above, it could be provided that the extension of the support body 49 along the distance direction 52 is not greater than along the transverse direction 51.

The support body 49 comprises two projections 54 which are at a distance from one another in the distance direction 52. In a cross section with respect to the transverse direction 51, the projections 54 are formed with an arcuate contour. In the region of the apex, the projections 54 each have approximately a circular arc shape. The cross section is constant along the transverse direction 51.

The projections 54 are configured to extend longitudinally along the transverse direction 51 (FIG. 3). The projections 54 are preferably configured identically.

The support body 49, as viewed along the distance direction 52, is configured wave-shaped due to the shape of the projections 54 with wave peaks 55 running in the transverse direction 51 and a wave trough 56 between them.

Viewed in the direction of insertion 23, there is a front projection 54 and a rear projection 54.

The projections 54 of the support body 49 each form an alignment element 58.

The support device 39 comprises at least one magnetic element 60. In the present case, a plurality of magnetic elements 60 are provided, in particular four magnetic elements 60. Each magnetic element 60 forms a coupling element 61.

A receptacle 62 is formed in each case on the support body 49 for receiving a magnetic element 60. The receptacle 62 is configured as a blind hole and is formed by a side of the support body 49 facing the portion 50. The receptacle 62 is closed by means of a closing element 63.

In this way, the magnetic element 60 is arranged inside the support body 49. In particular, a surface 64 on the upper side of the support body 49 is free of openings.

The magnetic elements 60 are each positioned on the projections 54. Two magnetic elements 60 are arranged on a respective projection 54, which are spaced apart in the transverse direction 51 (FIG. 3).

In the present case, the holding device 38 comprises a main body 66. On the main body 66, at least one holding element 67 is mounted pivotably about a pivot axis 68. In the present case, two holding elements 67 are provided which are configured identically, which is why one holding element 67 is substantially described.

Starting from the main body 66, the holding element 67 extends in the direction of the transport apparatus 18 and has a holding projection 69 at a free end. A holding member 70 is arranged on the holding projection 69.

A coupling element 71 of the holding device 38 is pivotally coupled to the holding element 67. The coupling elements 71 are operatively connected to each other via a pre-tensioning element 72. In the present case, the pre-tensioning element 72 is configured as a spring element, for example as a compression spring.

When the holding elements 67 on the holding members 70 are spread relative to one another, this takes place against the action of the pre-tensioning element 72. Conversely, the holding elements 67 can be pivoted again under the action of the pre-tensioning element 72 so that the holding members 70 are brought closer together.

The holding device 38 comprises a cover element 74 which covers the main body 66, the coupling elements 71 and the pre-tensioning element 72.

The holding device 38 comprises a container receptacle 75 for the container 12. The container receptacle 75 is arranged on the holding device 38 facing the transport apparatus 18. A receiving direction 76 (FIG. 4) is aligned with a direction of extension 77 of the container 12 when it is arranged in the container receptacle 75.

The direction of insertion 23 and/or the removal direction 24 preferably lie(s) in a plane perpendicular to which the receiving direction 76 is aligned.

The container receptacle 75 has abutment elements 78 for the container 12, which are preferably integrally formed on the cover element 74.

For insertion into the container receptacle 75, the container 12 is moved with the transport apparatus 18 in the direction of insertion 23. When the container 12 contacts the holding members 70, a force F1 acts on the holding device 38. The force F1 is aligned in the direction of insertion 23

Figures 5, 6:
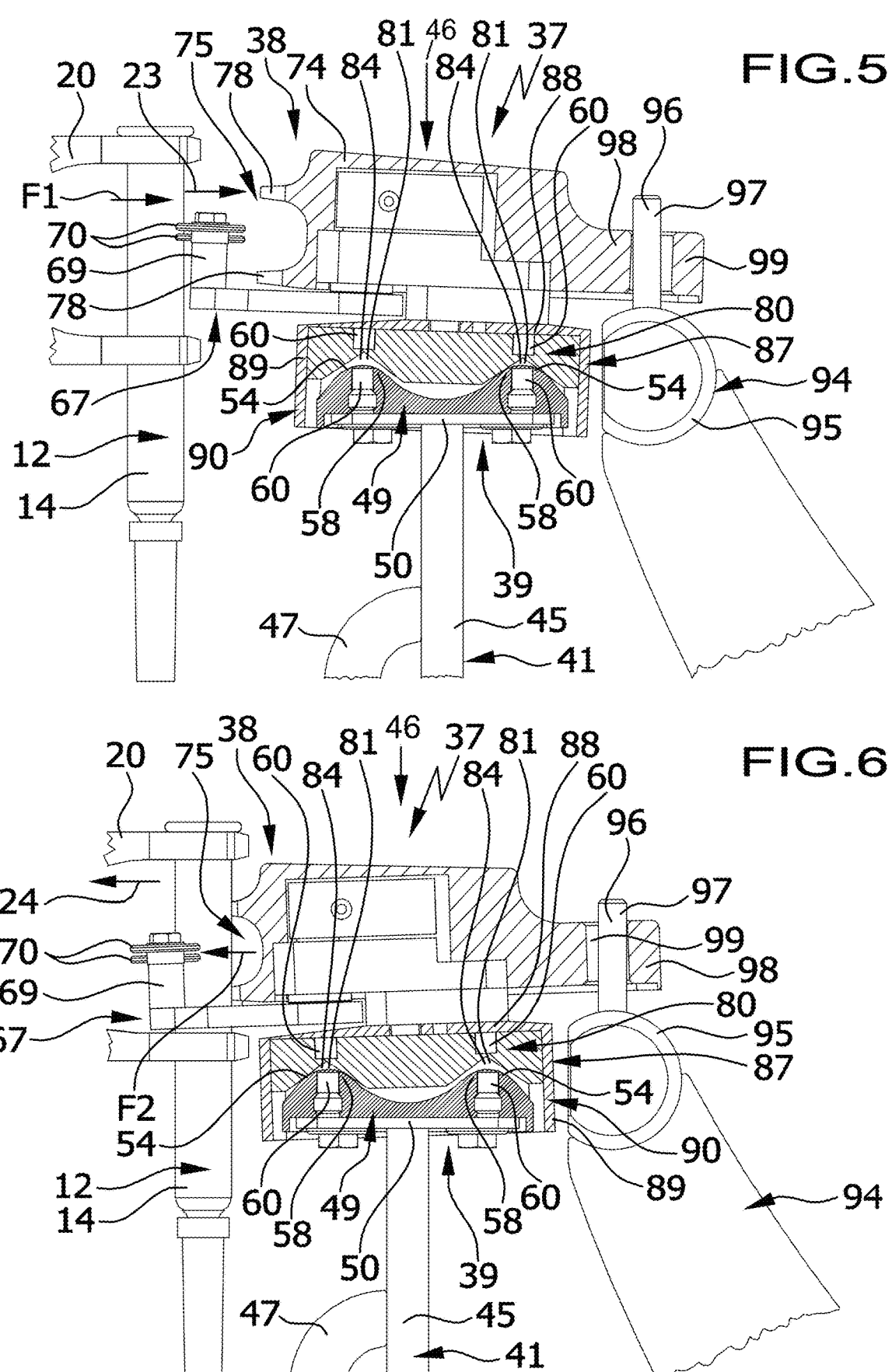
FIG. 5 is a view similar to FIG. 4 in a partially sectioned partial view, wherein the container contacts holding elements of the fixing apparatus and the holding device of which is tilted relative to the support device thereof and assumes a tilted position.
FIG. 6 is a view similar to FIG. 5, wherein the container is removed from the fixing apparatus, wherein the holding device is arranged in a different tilted position relative to the support device.
Figures 7, 8:
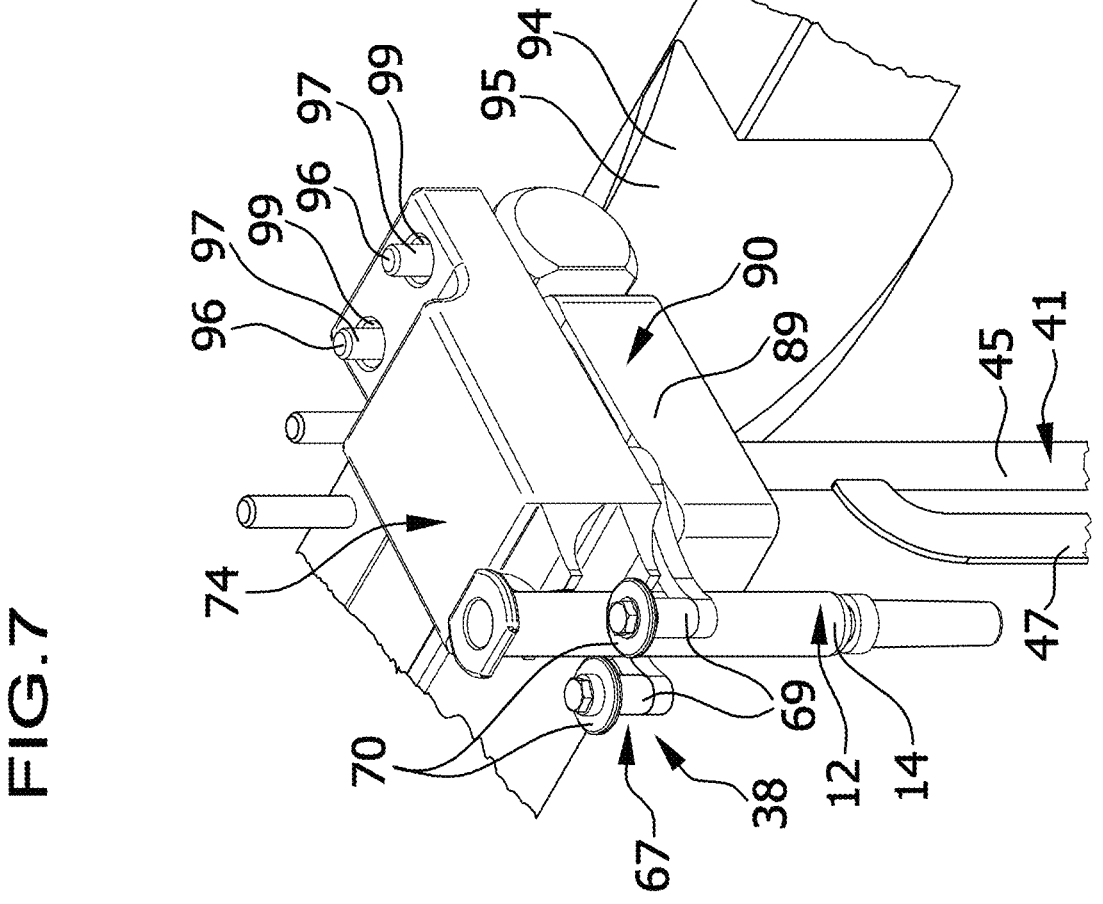
FIG. 7 is an enlarged view in accordance with detail A in FIG. 2, wherein a container is held on the fixing apparatus.
FIG. 8 is a perspective view of the fixing apparatus similar to FIG. 7, omitting the container, a stop part, and a cover element of the fixing apparatus.

(FIG. 5). The holding elements 67 are spread relative to one another by the force F1, and the container can be inserted into the container receptacle 75. It then assumes the position shown in FIGS. 3 and 7.

During removal from the container receptacle 75, the container 12 is moved in the removal direction 24. The container 12 applies a force F2 to the holding device 38 (FIG. 6). The force F2 acts in the removal direction 24. The holding elements 67 are spread relative to one another by the force F2, and the container 12 can be removed.

The holding device 38 has a contact body 80 for interacting with the support body 49.

The contact body 80 is substantially configured rectangular in plan view along the direction of gravity 46. Here, the extension in the distance direction 52 is greater than in the transverse direction 51. However, as with the support body 49, this could also be different.

In the distance direction 52, the contact body 80 is longer than the support body 49 and protrudes beyond it on both sides. The same can be provided correspondingly in the transverse direction 51.

In the present case, receptacles 81 are formed on the contact body 80, facing the support body 49, wherein each projection 54 can engage in one of the receptacles 81 which is associated with it.

The receptacles 81 are spaced apart from one another in the distance direction 52 and here have the same distance from one another as the projections 54. The receptacles 81 are preferably configured to be identical.

In cross section with respect to the transverse direction 51, the receptacles 81 are V-shaped in the present example. An edge in each case of the receptacle 81 has two edge portions 82, 83 adjoining one another at an angle. The angle between the edge portions 82, 83 is, for example, approximately 90° to 120°, preferably approximately 100° to 110°.

The cross section of the receptacles 81 is constant in the transverse direction 51. Accordingly, receptacles 81 having a V-shaped cross section are provided on the contact body 80, running in the transverse direction 81. The receptacles 81 are formed as grooves 79.

The receptacles 81 form alignment elements 84 for interacting with the alignment elements 58.

At least one magnetic element 60 is also arranged on the contact body 80. A plurality of magnetic elements 60 are provided, in particular four, corresponding to the number of magnetic elements 60 on the support body 49. The magnetic elements 60 of the contact body 80 form coupling elements 85 for coupling to the coupling elements 61.

The magnetic elements 60 are received in blind-hole-type receptacles 62 of the contact body 80, which are formed on the side of the contact body 80 facing away from the support body 49. In particular, a surface on the lower side of the contact body 80 is void of openings.

The magnetic elements 60 are arranged in the region of the receptacles 81. Two magnetic elements 60 spaced apart from one another in the transverse direction 51 are arranged on each receptacle 81.

Figure 4:
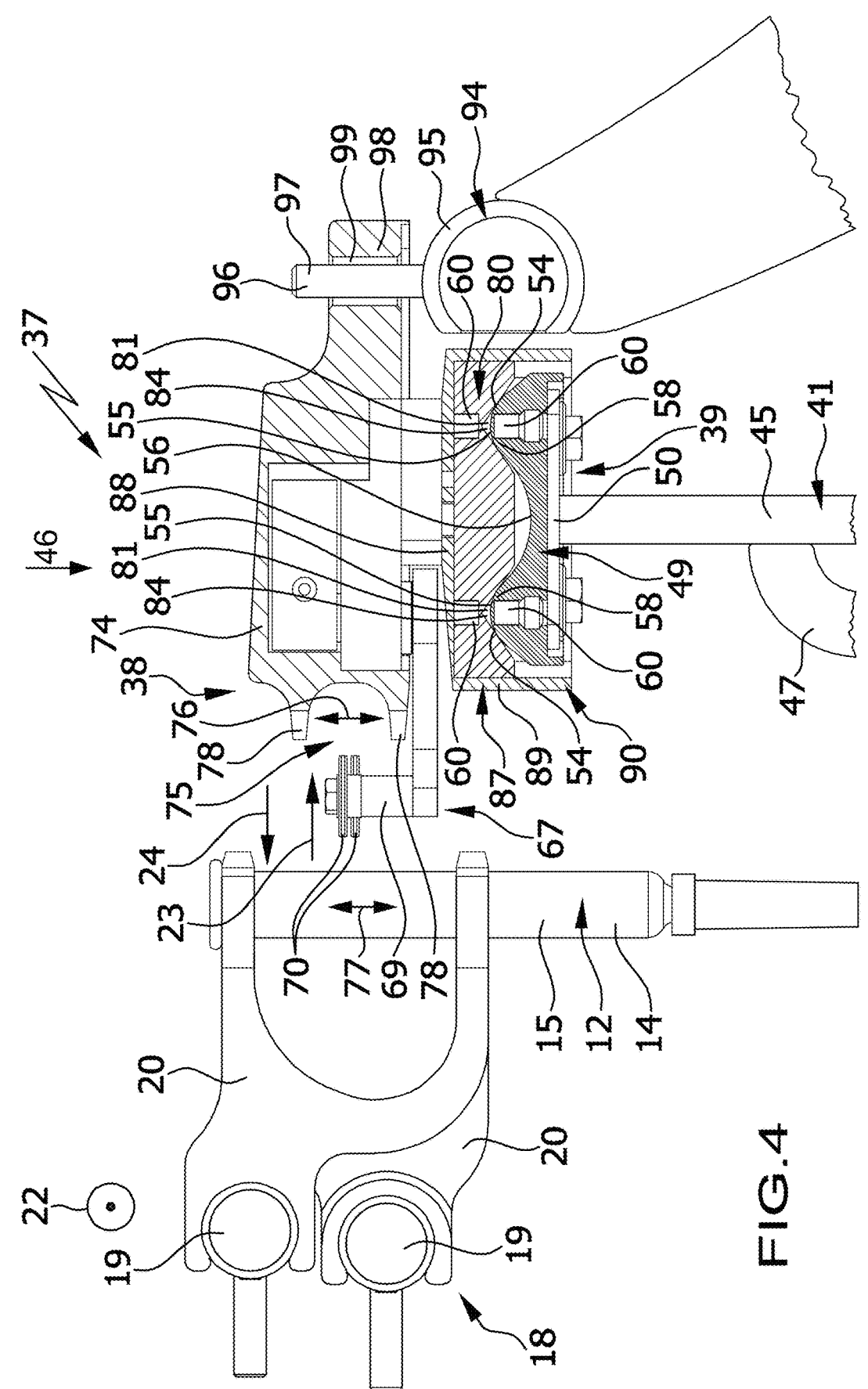
FIG. 4 is a partially sectioned side view of the fixing apparatus in accordance with the present disclosure and a transport apparatus with which a container is to be transferred to the fixing apparatus.

The magnetic elements 60 of the support body 49 and of the contact body 80 are situated opposite one another when they assume a target position relative to one another (FIG. 4). In particular, in this case the magnetic elements 60 on the contact body 80 are arranged above, and in particular directly above, the magnetic elements 60 on the support body 49 in the direction of gravity 46.

The magnetic elements 60 on the support body 49 and on the contact body 80 have opposite polarizations to one another, so that they attract one another and exert a coupling magnetic force (coupling force) on one another.

The holding device 38 has a receptacle 87. The receptacle 87 is hood-shaped and has a top wall 88 and a surrounding side wall 89. The side wall 89 protrudes from the top wall 88 in the direction of the support device 39 and forms a frame 90.

The top wall 88 is held on the main body 66 via a connection element 91.

The contact body 80 is dimensioned such that in the present case it is arranged in a positive-locking manner in the receptacle 87 and preferably rests on the top wall 88. As an example, the contact body 80 is connected to the main body 66 via a screw element 92.

The support device 39 engages in the receptacle 87 from below. The support body 49, and in the present case also the portion 50, are arranged in the receptacle 87. The frame 90 surrounds the contact body 80 and the support body 49.

The receptacle 87 is dimensioned such that the support body 49 is arranged with play in the receptacle 87, at the front and rear in the distance direction 52. In the transverse direction 51, the support body 49 is preferably arranged in a positive-locking manner in the receptacle 87.

The fixing apparatus 37 comprises a stop part 94. The stop part 94 can alternatively be part of the system 10 or of the weighing apparatus 30. In the present case, the stop part 94 is preferably positioned in a stationary manner and in particular held on the framework 35. The stop part 94 is formed separately from the support device 39 and the holding device 38.

The stop part 94 comprises a main body 95. Stop elements 96 are arranged on the main body 95. In the present case, each holding device 38 is assigned two stop elements 96 which are configured as peg-shaped projections 97.

Corresponding stop elements 98 are comprised by the holding device 38. The stop elements 98 are framed engagement openings 99, in particular through-openings, on the holding device 38.

In the present case, the stop elements 96, 98 are arranged on the side of the holding device 38 facing away from the container receptacle 75.

The diameter of the engagement openings 99 is dimensioned such that the projections 97 engage with play in the engagement openings 99. This provides the possibility of moving the holding device 38 relative to the stop part 94. However, the range of movement is determined and limited by the dimensioning of a projection 97 relative to the engagement opening 99.

In a different embodiment of the stop part 94, for example at least one stop element 98 is provided which is non-circular, for example is oval or elliptical, and which engages in a corresponding engagement opening 99.

As can be seen in particular from FIGS. 3 to 6, the holding device 38 is placed onto the support device 39. For example, the placement takes place in the direction of gravity 46.

The holding device 38 rests on the support body 49, and thereby on the support device 39, via the contact body 80. In particular, the contact body 80 and the support body 49 rest loosely on one another and do not have a fixed mechanical connection to one another.

No further abutment of the holding device 38 on the support device 39 is provided via the abutment of the contact body 80 and the support body 49.

The contact body 80 can assume a defined target position on the support body 49 (FIG. 4). In the target position, the projections 54 engage in the receptacles 81. The corresponding magnetic elements 60 are arranged directly opposite one another and interact via the magnetic force.

It will be understood that the magnetic elements 60 of the contact body 80 and of the support body 49 do not contact one another.

In the target position of the two bodies 49, 80, the projections 97 engage in the engagement openings 99 in a centered manner.

The bodies 49, 80 in particular assume the target position when no force F1 or F2 acts on the holding device 38 via the container 12.

The holding device 38 can be lifted against the direction of gravity 46 by the support device 39. In this case, the magnetic force of the magnetic elements 60 is also overcome.

The contact body 80 is configured to be movable relative to the support body 49. This makes it possible to move the holding device 38 relative to the support device 39.

In particular, there is the possibility of a tilting movement of the holding device 38 toward the rear relative to the direction of insertion 23, and also toward the front relative to the direction of insertion 23. This is discussed below.

The force F1 acting during the insertion of the container 12 into the container receptacle 75, as mentioned above, acts on the holding device 38 as a whole via the holding elements 67. The holding device 38 can tilt toward the rear, wherein the tilting moment is based on the force F1.

Since the contact body 80 rests only loosely on the support body 49, the contact body 80 can be lifted in the region of the front receptacle 81. In the region of the rear receptacle 80, the projection 54 remains in the receptacle 81 (FIG. 5).

However, the range of movement of the holding device 38 during the tilting movement is limited by the stop elements 96, 98. If the projection 97 strikes against the edge of the engagement opening 99, no further tilting movement of the holding device 38 takes place.

The tilting of the holding device 38 takes place against the magnetic force of the magnetic elements 60. If the force F1 drops out, the contact body 80 returns to the original target position in accordance with FIG. 4 under the effect of gravity and the magnetic force. This target position is in particular assumed during the weighing process.

When the container 12 is removed from the container receptacle 75, the mentioned force F2 acts on the holding device 38 as a whole via the holding elements 67.

The holding device 38 can tilt forward relative to the support device 39, wherein the tilting moment is based on the force F2.

Since the contact body 80 rests only loosely on the support body 49, the contact body 80 can be lifted in the region of the rear receptacle 81. In contrast, the projection 54 remains in the receptacle 81 in the region of the front receptacle 81.

The range of movement of the tilting movement of the holding device 38 is also limited in this case by the stop elements 96, 98. The holding device 38 can be tilted until the projection 97 abuts the rear edge of the engagement opening 99 (FIG. 6).

If the force F2 drops out, the contact body 38 returns to the target position on the support body 49, under the effect of gravity and the magnetic force of the magnetic elements 60. This is the case for example when there is no container 12 arranged in the container receptacle 75.

Due to the configuration of the fixing apparatus 37 in accordance with the present disclosure, the force acting on the support device 39 and via the latter on the weighing cell 31 can be limited during insertion and removal of the containers 12. An excessive load and damage to the weighing cell 31 can be avoided in this way. In addition, settling processes can be shortened and the measurement result can be improved.

Furthermore, the probability of damage to the container 12 during insertion into the container receptacle 75 or during removal from the container receptacle 75 can be reduced by the tilting movements of the holding device 38.

It will be understood that a tilting of the holding device 38 occurs for example only when the force F1 and/or F2 exceeds a threshold value and generates a tilting moment which is sufficiently large to tilt the holding device 38 to the rear and/or to the front.

LIST OF REFERENCE NUMERALS

10 System
12 Container
14 Syringe
15 Syringe body
17 Transport assembly
18 Transport apparatus
19 Holding part
20 Gripping element
22 Transport direction
23 Direction of insertion
24 Removal direction
26 Drive apparatus
27 Coupling element
28 Decoupling element
30 Weighing apparatus
31 Weighing cell
32 Filling apparatus
33 Closing apparatus
34 Control apparatus
35 Framework
37 Fixing apparatus
38 Holding device
39 Support device
41 Connection body
42 Base element
43 Connection element
44 Receptacle element
45 Column element
46 Direction of gravity
47 Stiffening element
49 Support body
50 Portion
51 Transverse direction
52 Distance direction
54 Projection
55 Wave peak
56 Wave trough
58 Alignment element
60 Magnetic element
61 Coupling element
62 Receptacle
63 Closing element
64 Surface
66 Main body
67 Holding element
68 Pivot axis
69 Holding projection
70 Holding member
71 Coupling element
72 Pre-tensioning element

74 Cover element
75 Container receptacle
76 Receiving direction
77 Direction of extension
78 Abutment element
79 Groove
80 Contact body
81 Receptacle
82 Edge portion
83 Edge portion
84 Alignment element
85 Coupling element
87 Receptacle
88 Top wall
89 Side wall
90 Frame
91 Connection element
92 Screw element
94 Stop part
95 Main body
96 Stop element
97 Projection
98 Stop element
99 Engagement opening

The invention claimed is:

1. A system for processing pharmaceutical containers, the system comprising:
   a weighing apparatus;
   a fixing apparatus for temporarily fixing a pharmaceutical container to the weighing apparatus, the fixing apparatus comprising:
   a holding device and a support device;
   the holding device comprising:
   a contact body,
   a container receptacle into which the pharmaceutical container is insertable along an insertion direction, and out of which the pharmaceutical container is removeable,
   at least one holding element for holding the pharmaceutical container in the container receptacle; and
   the support device comprising:
   a support body, and
   a connection body connected to the support body for connecting to the weighing apparatus,
   wherein the holding device rests on top of the support body via the contact body,
   wherein the contact body is movable relative to the support body based on a force acting on the holding device when the pharmaceutical container is inserted into the container receptacle and/or when the pharmaceutical container is removed from the container receptacle, and
   wherein one of the support body and the contact body comprises an arcuate contour comprising two arcuate projections arranged at a distance from one another along the insertion direction and a trough therebetween, and
   the other of the support body and the contact body comprises two receptacles arranged at a distance from one another along the insertion direction and configured to receive the two arcuate projections.

2. The system according to claim 1, wherein the holding device and the support device or the contact body and the support body, rest on one another and/or do not have a fixed mechanical connection to one another.

3. The system according to claim 1, wherein the holding device rests on the support device solely via the contact body and the support body.

4. The system according to claim 1, wherein the holding device is configured to be:

placed on the support device in a direction of gravity; and lifted from the support device against the direction of gravity and thereby detached from the support device.

5. The system according to claim 1, wherein the pharmaceutical container is configured to be inserted into the container receptacle in the insertion direction and/or is configured to be removed from the container receptacle in a removal direction.

6. The system according to claim 5, wherein the insertion direction and/or the removal direction is aligned transversely or perpendicularly to a direction of extension of the pharmaceutical container.

7. The system according to claim 1, wherein the holding device is tiltable relative to the support device when the pharmaceutical container is inserted into the container receptacle and/or when the pharmaceutical container is removed from the container receptacle.

8. The system according to claim 1, wherein the holding device is displaceable relative to the support device.

9. The system according to claim 1, further comprising a stationary stop part with at least one first stop element, wherein the holding device comprises at least one corresponding second stop element for interacting with the at least one first stop element, wherein a range of movement of the holding device relative to the support device is limited in at least one direction via the at least one first stop element and the at least one corresponding second stop element.

10. The system according to claim 9, wherein:

the at least one first stop element and the at least one corresponding second stop element are arranged on a side of the holding device facing away from the container receptacle; and/or two stop elements of the at least one first stop element and the at least one corresponding second stop element are arranged at a distance from one another; and/or a movement range of a tilting movement of the holding device relative to the support device in at least one tilting direction is limited via said two stop elements.

11. The system according to claim 9, wherein:

the at least one first stop element comprises a peg-shaped projection and the at least one corresponding second stop element comprises an engagement opening in which the peg-shaped projection engages with play, or the at least one corresponding second stop element comprises a peg-shaped projection and the at least one first stop element comprises an engagement opening in which the peg-shaped projection engages with play.

12. The system according to claim 1, wherein the support body and the contact body comprise corresponding alignment elements that interact to define a target position of the contact body and of the support body.

13. The system according to claim 12, wherein:

the corresponding alignment elements comprise the two arcuate projections and the two receptacles.

14. The system according to claim 13, wherein:

the two arcuate projections are each arcuate in cross section; and/or the two arcuate projections are each arcuate in cross section at least in portions with a circular arc shape or a sinusoidal shape; and/or the two receptacles are V-shaped, trapezoidal, or arcuate in cross section.

15. The system according to claim 13, wherein the two arcuate projections rest on edges of the two receptacles along two contact lines when the contact body and the support body are in the target position.

16. The system according to claim 12, wherein the corresponding alignment elements extend longitudinally along an extension direction and have a constant cross section.

17. The system according to claim 12, wherein:

the support body or the contact body is wave-shaped along a distance direction, with two wave peaks running transversely or perpendicularly to the distance direction and a wave trough between the two wave peaks; and/or the contact body or the support body has two grooves arranged at a distance from one another along the distance direction and running transversely or perpendicularly to the distance direction.

18. The system according to claim 1, wherein the fixing apparatus comprises coupling elements interacting on the holding device and on the support device, such that a coupling force acts between the coupling elements.

19. The system according to claim 18, wherein the coupling elements are configured as or formed by magnetic elements that create a magnetic force, the holding device being moveable relative to the support device and/or removeable from the support device against the magnetic force.

20. The system according to claim 18, wherein the coupling elements comprise at least one coupling element on the contact body and at least one coupling element on the support body.

21. The system according to claim 18, wherein the coupling elements comprise a plurality of coupling elements arranged on the contact body and/or on the support body.

22. The system according to claim 18, wherein the coupling elements comprise at least one first coupling element on the holding device and at least one second coupling element on the support device, the at least one first coupling element arranged above the at least one second coupling element in a direction of gravity, or the at least one second coupling element arranged above the at least one first coupling element in the direction of gravity.

23. The system according to claim 1, wherein:

the support body and the contact body comprise alignment elements that interact to define a target position of the contact body and of the support body, the fixing apparatus comprises coupling elements interacting on the holding device and on the support device, between which elements a coupling force acts, and the coupling elements are arranged on at least one alignment element of the contact body and on at least one alignment element of the support body.

24. The system according to claim 1, wherein the fixing apparatus comprises a receptacle on the holding device or on the support device, in which receptacle the support device or the holding device engages, wherein the contact body and the support body are arranged in the receptacle.

25. The system according to claim 24, wherein the receptacle comprises or forms a top wall which covers the contact body and the support body, and/or a frame which surrounds the contact body and the support body along a circumference.

26. The system according to claim 24, wherein the support body or the contact body engages with play in the receptacle.

27. The system according to claim 1, further comprising:

at least one transport apparatus, the at least one transport apparatus operable to transfer at least one container to the fixing apparatus and remove said at least one container from the fixing apparatus.

28. A system for processing pharmaceutical containers, the system comprising:

a weighing apparatus;

a fixing apparatus for temporarily fixing a pharmaceutical container to the weighing apparatus, the fixing apparatus comprising:

a holding device and a support device;

the holding device comprising:

a contact body, a container receptacle into which the pharmaceutical container is insertable along an insertion direction, and out of which the pharmaceutical container is removeable, at least one holding element for holding the pharmaceutical container in the container receptacle; and the support device comprising:

a support body, and a connection body connected to the support body for connecting to the weighing apparatus, wherein the holding device rests on top of the support body via the contact body, wherein the contact body is movable relative to the support body based on a force acting on the holding device when the pharmaceutical container is inserted into the container receptacle and/or when the pharmaceutical container is removed from the container receptacle, and wherein the support body comprises an arcuate contour comprising two arcuate projections arranged at a distance from one another along the insertion direction and an arcuate trough therebetween and the contact body comprises two receptacles arranged at a distance from one another along the insertion direction and configured to receive the two arcuate projections.

* * * * *